US011531311B2

(12) United States Patent
Matsumoto et al.

(10) Patent No.: US 11,531,311 B2
(45) Date of Patent: Dec. 20, 2022

(54) DROPLET RANGE CONTROL SYSTEM AND METHOD FOR CONTROLLING RANGE OF DROPLETS

(71) Applicant: Panasonic Intellectual Property Management Co., Ltd., Osaka (JP)

(72) Inventors: Takaya Matsumoto, Osaka (JP); Noriaki Fukumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/953,248

(22) Filed: Nov. 19, 2020

(65) Prior Publication Data

US 2021/0072713 A1 Mar. 11, 2021

Related U.S. Application Data

(63) Continuation of application No. PCT/JP2019/027959, filed on Jul. 16, 2019.

(30) Foreign Application Priority Data

Aug. 30, 2018 (JP) ............................ JP2018-161359

(51) Int. Cl.
*G05B 19/042* (2006.01)
*F24F 11/63* (2018.01)

(52) U.S. Cl.
CPC ............ *G05B 19/042* (2013.01); *F24F 11/63* (2018.01); *G05B 2219/2614* (2013.01)

(58) Field of Classification Search
CPC ........... G05B 19/042; G05B 2219/2614; F24F 11/63; F24F 2120/12; F24F 2110/10;
(Continued)

(56) References Cited

U.S. PATENT DOCUMENTS

2012/0199003 A1* 8/2012 Melikov ................. F24F 3/163
95/273
2014/0363333 A1* 12/2014 Carr .......................... A61L 9/02
422/4
2019/0122759 A1* 4/2019 Wakimoto ............ G16H 40/20

FOREIGN PATENT DOCUMENTS

JP 2012-135325 7/2012
JP 2014-137754 7/2014
JP 2017-117416 6/2017

OTHER PUBLICATIONS

Chen et al. (C. Chen, C.H. Lin, Z. Jiang, Q. Chen, Simplified models for exhaled airflow from a cough with the mouth covered, Dec. 2014, Indoor Air/International Journal of Indoor Environment and Health, vol. 24, Issue 6, pp. 580-591) (Year: 2014).*

(Continued)

*Primary Examiner* — Michael W Choi
(74) *Attorney, Agent, or Firm* — Wenderoth, Lind & Ponack, L.L.P.

(57) ABSTRACT

A droplet range control system includes a first obtainer that obtains environment information indicating at least wind speed in a space, wind direction in the space, temperature in the space, humidity in the space, or spatial scale, a second obtainer that obtains target information indicating positions and directions of faces of a first target and a second target in the space, an estimator that estimates a range of droplets from the first target on a basis of the environment information and the target information, and a controller that, if a respiration area of the second target exists within the range, conditions an environment in the space such that the respiration area gets out of the range.

12 Claims, 8 Drawing Sheets

(58) Field of Classification Search
CPC .... F24F 2110/20; F24F 2110/30; F24F 11/79; F24F 11/74
USPC .......................................................... 700/276
See application file for complete search history.

(56) References Cited

OTHER PUBLICATIONS

International Search Report of PCT application No. PCT/JP2019/027959 dated Oct. 1, 2019.
X. Xie et al., “How far droplets can move in indoor environments—revisiting the Wells evaporation-falling curve”, Indoor Air 2007; 17(3), Jun. 1, 2007, pp. 211-225.

* cited by examiner

FIG. 7

| ENVIRONMENTAL RISK LEVEL | | WIND SPEED OF DIRECTIONAL COMPONENT BETWEEN RESPIRATION AREAS | | | |
|---|---|---|---|---|---|
| | | 0.25 m/s OR LOWER | 0.25 m/s TO 0.50 m/s | 0.50 m/s TO 1.00 m/s | 1.00 m/s OR HIGHER |
| RELATIVE HUMIDITY | 70% OR HIGHER | A | B | C | C |
| | 30% TO 70% | B | B | C | D |
| | 30% OR LOWER | C | C | D | E |

FIG. 8

| HUMAN RISK LEVEL | | RELEASE ACTION | | | |
|---|---|---|---|---|---|
| | | RESPIRATION | CONVERSATION | COUGHING | SNEEZING |
| MALE | ELDERLY | 1 | 2 | 4 | 5 |
| | ADULT | 1 | 2 | 5 | 6 |
| | CHILD | 1 | 2 | 3 | 4 |
| FEMALE | ELDERLY | 1 | 2 | 3 | 4 |
| | ADULT | 1 | 2 | 4 | 5 |
| | CHILD | 1 | 2 | 3 | 4 |

FIG. 9

| LINEAR REACH | | HUMAN RISK LEVEL | | | | | |
|---|---|---|---|---|---|---|---|
| | | 1 | 2 | 3 | 4 | 5 | 6 |
| ENVIRONMENTAL RISK LEVEL | A | 0.1 m | 0.2 m | 0.5 m | 1.0 m | 1.5 m | 2.0 m |
| | B | 0.1 m | 0.3 m | 0.6 m | 1.2 m | 1.9 m | 2.5 m |
| | C | 0.2 m | 0.3 m | 0.7 m | 1.4 m | 2.2 m | 3.0 m |
| | D | 0.2 m | 0.4 m | 0.8 m | 1.6 m | 2.9 m | 4.0 m |
| | E | 0.3 m | 0.4 m | 0.9 m | 1.8 m | 3.5 m | 5.0 m |

FIG. 10

| FIRST DROPLET SUPPRESSION ACTION | CORRECTION COEFFICIENT |
|---|---|
| WITHOUT ACTION | 1 |
| MOUTH COVERED | 0.2 |
| MASK | 0.1 |

FIG. 11

| SECOND DROPLET SUPPRESSION ACTION | | CORRECTION COEFFICIENT |
|---|---|---|
| TURNING ANGLE | 10° OR SMALLER | 1 |
| | 10° TO 40° | 0.5 |
| | 40° OR LARGER | 0.2 |

FIG. 12

| HEALTH STATE | CORRECTION COEFFICIENT |
|---|---|
| NORMAL STATE | 1 |
| SEVERELY ILL STATE | 1.5 |

FIG. 13

| HEIGHT DIFFERENCE | CORRECTION COEFFICIENT |
|---|---|
| 10 cm OR SMALLER | 1 |
| 10 cm TO 20 cm | 1.2 |
| 20 cm OR LARGER | 1.4 |

FIG. 14

| COMFORT | | WIND SPEED OF DIRECTIONAL COMPONENT BETWEEN RESPIRATION AREAS | | | |
|---|---|---|---|---|---|
| | | 0.25 m/s OR LOWER | 0.25 m/s TO 0.50 m/s | 0.50 m/s TO 1.00 m/s | 1.00 m/s OR HIGHER |
| RELATIVE HUMIDITY | 70% OR HIGHER | C | C | D | E |
| | 30% TO 70% | A | B | C | D |
| | 30% OR LOWER | C | C | D | E |

FIG. 17
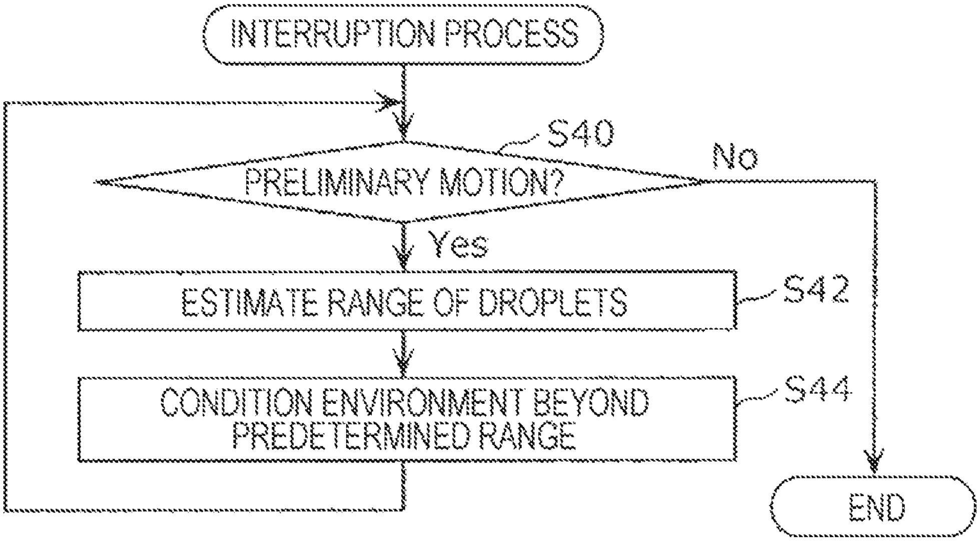
FIG. 18
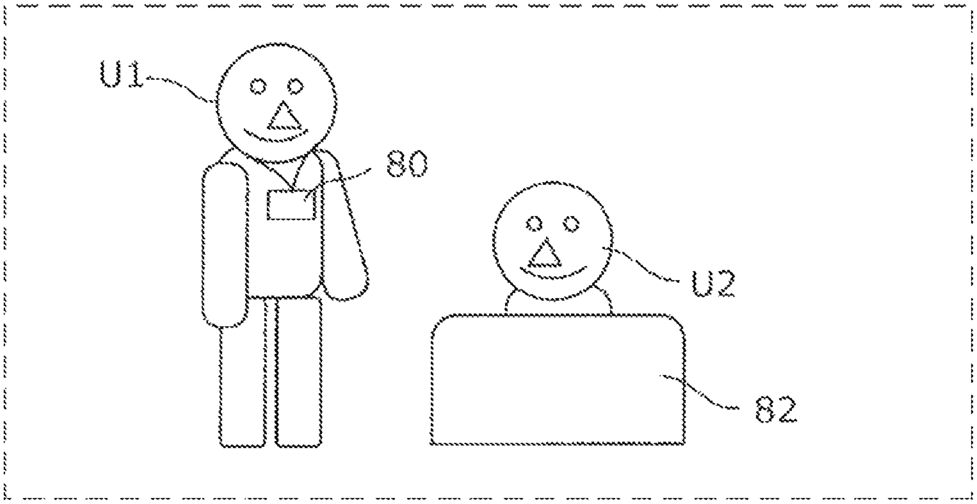
FIG. 19
| | CONDITION | POSITION | |
|---|---|---|---|
| | | FIRST TARGET | SECOND TARGET |
| ACTION 001 | 13:00 | NEAR DOOR | NEAR DOOR |
| ACTION 002 | TWO MINUTES AFTER ENTRY | NEAR BED | IN BED |

DROPLET RANGE CONTROL SYSTEM AND METHOD FOR CONTROLLING RANGE OF DROPLETS

BACKGROUND

1. Technical Field

The present disclosure relates to a droplet range control system and a method for controlling a range of droplets.

2. Description of the Related Art

Droplet infection is one of infection routes of infectious diseases typified by influenza and *mycoplasma* pneumonia. In droplet infection, persons around a carrier are infected by viruses on droplets released as a result of coughing, sneezing, or the like.

Techniques disclosed in Japanese Unexamined Patent Application Publication No. 2017-117416 and Japanese Unexamined Patent Application Publication No. 2012-135325 are known as techniques for suppressing droplet infection. An infection candidate identification apparatus disclosed in Japanese Unexamined Patent Application Publication No. 2017-117416 narrows down candidates for infection due to droplet infection on the basis of a position and a time at which a carrier has taken an action to release droplets. An air purification system disclosed in Japanese Unexamined Patent Application Publication No. 2012-135325 purifies air by collecting microparticles floating in the air inside a room, such as viruses, using generated water particles.

SUMMARY

Droplets are generally assumed to fly about 2 m at maximum. A range of droplets, however, varies depending on environmental factors such as wind speed, wind direction, and humidity. According to Xie X., Li Y., Chwang A. T., Ho P. L., and Seto W. H., "How far droplets can move in indoor environments-revisiting the Wells evaporation-falling curve", Indoor Air, 2007 Jun. 17(3), 211-225, for example, as a result of a simulation of a relationship between a range of droplets in the case of coughing and relative humidity, reach of droplets of about 30 μm in diameter was found to differ about 80 cm between when relative humidity is 30% and when relative humidity is 70%.

Because the above examples of the related art do not take into consideration such environmental factors, there is a problem in that accuracy of estimating a range of droplets is low and droplet infection cannot be suppressed efficiently.

One non-limiting and exemplary embodiment provides a droplet range control system and a method for controlling a range of droplets capable of efficiently suppressing droplet infection.

In one general aspect, the techniques disclosed here feature a droplet range control system including a first obtainer that obtains environment information indicating at least wind speed in a space, wind direction in the space, temperature in the space, humidity in the space, or spatial scale, a second obtainer that obtains target information indicating positions and directions of faces of a first target and a second target in the space, an estimator that estimates a range of droplets from the first target on a basis of the environment information and the target information, and a controller that, if a respiration area of the second target exists within the range, conditions an environment in the space such that the respiration area gets out of the range.

According to the present disclosure, droplet infection can be efficiently suppressed.

It should be noted that this general or specific aspect may be implemented as an apparatus, a method, an integrated circuit (IC), a computer program, a computer-readable storage medium, or any selective combination thereof. The computer-readable storage medium may be, for example, a nonvolatile storage medium such as a compact-disc read only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a diagram illustrating an example of an environmental risk database used by the droplet range control system according to the embodiment;

FIG. 8 is a diagram illustrating an example of a human risk database used by the droplet range control system according to the embodiment;

FIG. 9 is a diagram illustrating an example of a droplet reach database used by the droplet range control system according to the embodiment;

FIG. 10 is a diagram illustrating an example of a correction coefficient database based on a first droplet suppression action used by the droplet range control system according to the embodiment;

FIG. 11 is a diagram illustrating an example of a correction coefficient database based on a second droplet suppression action used by the droplet range control system according to the embodiment;

FIG. 12 is a diagram illustrating an example of a correction coefficient database based on a health state used by the droplet range control system according to the embodiment;

FIG. 13 is a diagram illustrating an example of a correction coefficient database based on a height difference between targets used by the droplet range control system according to the embodiment;

FIG. 14 is a diagram illustrating an example of a comfort database used by the droplet range control system according to the embodiment;

FIG. 17 is a flowchart illustrating a process performed by the droplet range control system according to the embodiment at a time when a preliminary motion is detected;

FIG. 18 is a diagram illustrating a positional relationship between two targets of a droplet range control system according to a modification of the embodiment; and FIG. 19 is a diagram illustrating a specific action database used by the droplet range control system according to the modification of the embodiment.

DETAILED DESCRIPTION

Outline of Present Disclosure

Figure 1:
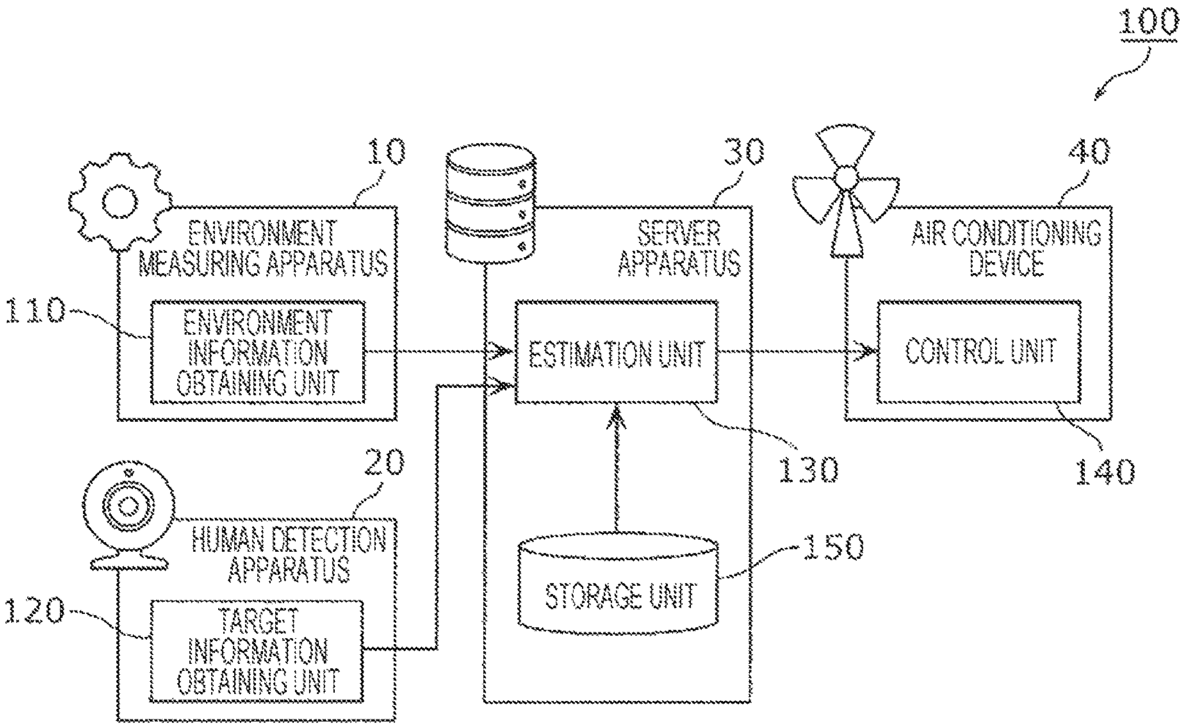
FIG. 1 is a diagram illustrating the configuration of a droplet range control system according to an embodiment.

A droplet range control system according to an aspect of the present disclosure includes a first obtainer that obtains environment information indicating at least wind speed in a space, wind direction in the space, temperature in the space, humidity in the space, or spatial scale, a second obtainer that obtains target information indicating positions and directions of faces of a first target and a second target in the space, an estimator that estimates a range of droplets from the first target on a basis of the environment information and the target information, and a controller that, if a respiration area of the second target exists within the range, conditions an environment in the space such that the respiration area gets out of the range.

As a result, since the environment is conditioned, if the respiration area of the second target exists within the range of droplets from the first target, such that the respiration area gets out of the range of droplets, the second target is less likely to be infected by droplets from the first target. In addition, if the range of droplets from the first target does not include the respiration area of the second target, a probability that droplets from the first target enter the second target's body through his/her nose or mouth is sufficiently low, even if the first target releases the droplets. In addition, when there is only one target in the space, too, a probability that droplets enter someone else's body is extremely low. Since the environment need not be conditioned in these cases, therefore, consumption of energy, such as power, for conditioning the environment can be reduced. With the droplet range control system according to this aspect, droplet infection can thus be suppressed efficiently since the environment is conditioned especially when a probability of droplet infection is high.

In addition, since the first target and the second target need not wear special measuring devices or the like, the droplet range control system can be used in various environments. Not only predetermined persons but also unexpected visitors, for example, can be determined as targets, and droplet infection can be efficiently suppressed.

A range of droplets depends on relative humidity. More specifically, the higher the relative humidity, the smaller the range of droplets, and the lower the relative humidity, the larger the range of droplets.

In the droplet range control system according to the aspect of the present disclosure, therefore, for example, the environment information may indicate the humidity in the space. The estimator may also estimate humidity distribution in the space. The environment to be conditioned may be first humidity in a space between the first target and the second target. The controller may adjust the first humidity on a basis of the humidity distribution.

As a result, since the range of droplets can be reduced by increasing relative humidity, for example, an overlap between the range of droplets and the respiration area can be suppressed. Consequently, droplet infection can be suppressed.

In addition, for example, the controller may adjust the first humidity to relative humidity of 40% to 70%.

As a result, droplet infection can be suppressed while maintaining comfort of the targets.

In addition, for example, the environment information may indicate the wind speed and the wind direction in the space. The estimator may also estimate airflow distribution in the space. The environment to be conditioned may be first airflow between the first target and the second target. The controller may adjust the first airflow on a basis of the airflow distribution.

As a result, since the range of droplets can be changed by adjusting wind speed and wind direction of airflow, an overlap between the range of droplets and the respiration area can be suppressed. Consequently, droplet infection can be suppressed.

In addition, for example, the controller may adjust the first airflow such that an angle between a line connecting a respiration area of the first target and the respiration area of the second target and a wind direction of the first airflow becomes 10° or larger.

As a result, since the range of droplets significantly deviates from the respiration area, droplet infection can be suppressed.

In addition, for example, the controller may adjust wind speed of the first airflow to 0.5 m/s or lower.

As a result, droplet infection can be suppressed while maintaining comfort of the targets.

In addition, for example, the estimator may estimate the range further on a basis of attribute information indicating a physical characteristic of the first target.

As a result, for example, the range of droplets can be accurately estimated on the basis of a physical characteristic such as gender, age, or height. Since accuracy of the estimated range increases, droplet infection can be further suppressed.

In addition, for example, the estimator may estimate a health state of the first target on a basis of at least either the environment information or the target information and then estimate the range on a basis of the estimated health state.

As a result, the range of droplets can be accurately estimated on the basis of a health state. Since accuracy of the estimated range increases, droplet infection can be further suppressed.

In addition, for example, the estimator may detect a preliminary motion of a droplet release action taken by the first target, predict a release direction of the droplets and an amount of droplets released on a basis of the detected preliminary motion, and estimate the range further on a basis of the prediction. If the preliminary motion is detected, the controller may condition the environment beyond a predetermined adjustment range.

If a preliminary motion is detected, a probability of droplet infection increases significantly. The environment, therefore, is conditioned beyond the predetermined adjustment range. As a result, a probability that droplets released after the preliminary motion enter someone else's body through his/her nose or mouth can be sufficiently reduced. Droplet infection, therefore, can be further suppressed.

In addition, for example, the droplet range control system according to the aspect of the present disclosure may further include a storage storing an action history of each of the first target and the second target. The estimator may also estimate, on a basis of the action histories, that the first target is located at a first place and the second target is located at a second place at a first time. The controller may condition the environment in the space such that the respiration area of the second target located at the second place gets out of the range of droplets from the first target located at the first place before the first time.

As a result, the environment can be conditioned in advance on the basis of the action histories such that the respiration area gets out of the range of droplets. That is, since the environment need not be changed suddenly, for example, consumption of energy, such as power, for conditioning the environment can be reduced.

In addition, for example, the estimator may estimate the range on a basis of a droplet suppression action taken by the first target.

As a result, for example, the range of droplets can be accurately estimated on the basis of a droplet suppression action such as wearing of a mask or turning of the face. In addition, when a target wears a mask, for example, a range of droplets becomes sufficiently smaller than when the target does not. Since it becomes unlikely that a respiration area exists within the range, therefore, frequency of conditioning the environment is reduced. Consequently, since consumption of energy, such as power, for conditioning the environment can be reduced, droplet infection can be efficiently suppressed.

In addition, a method for controlling a range of droplets according to an aspect of the present disclosure includes obtaining environment information indicating at least wind speed in a space, wind direction in the space, temperature in the space, humidity in the space, or spatial scale, obtaining target information indicating positions and directions of faces of a first target and a second target in the space, estimating a range of droplets from the first target on a basis of the environment information and the target information, and conditioning, if a respiration area of the second target exists within the range, an environment in the space such that the respiration area gets out of the range.

As a result, as with the above-described droplet range control system, droplet infection can be efficiently suppressed.

An embodiment will be specifically described hereinafter with reference to the drawings.

The embodiment that will be described hereinafter is a general or specific example. Values, shapes, materials, components, arrangement positions and connection modes of the components, steps, order of the steps, and the like are examples, and do not limit the present disclosure. Among the components described in the following embodiment, ones not described in the independent claims will be described as optional components.

The drawings are schematic diagrams and not necessarily exact. Scales, for example, are therefore not consistent between the drawings. In the drawings, substantially the same components are given the same reference numerals, and redundant description is omitted or simplified.

Embodiment

1. Configuration

First, the configuration of a droplet range control system according to an embodiment will be described.

Figure 2:
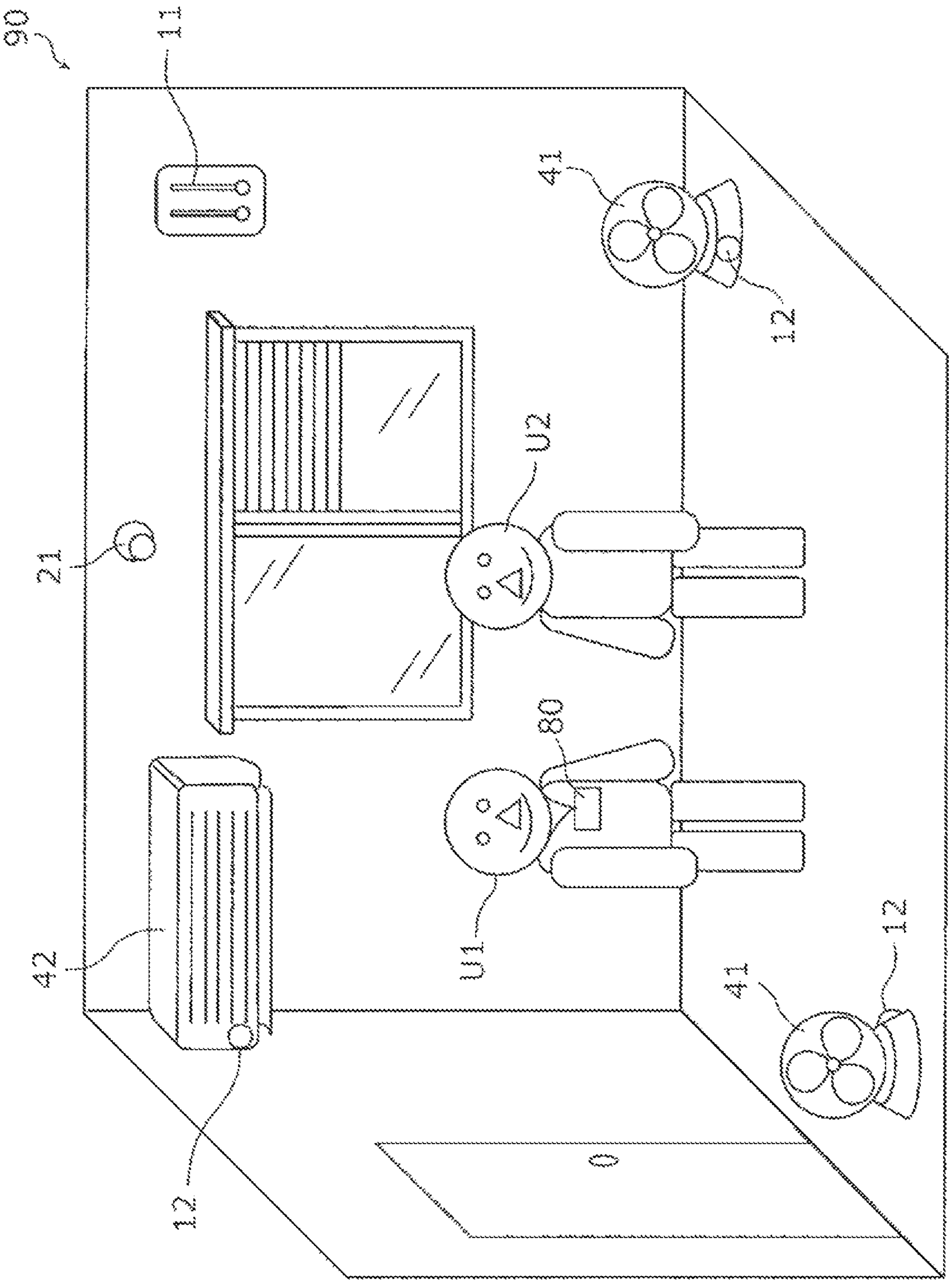
FIG. 2 is a diagram illustrating an example of a space where the droplet range control system according to the embodiment is used.

FIG. 1 is a diagram illustrating the configuration of a droplet range control system 100 according to the present embodiment. FIG. 2 is a diagram illustrating an example of a space 90 where the droplet range control system 100 according to the present embodiment is used.

The droplet range control system 100 illustrated in FIG. 1 is used to suppress infection with diseases caused by droplets (i.e., droplet infection). Droplets are mainly released from a person's mouth when the person takes a droplet release action. The droplet release action is sneezing, coughing, conversation (or utterance), respiration, or the like. When a person is infected with influenza or *mycoplasma* pneumonia, for example, droplets from the person include pathogens such as influenza viruses or mycoplasmas. If the droplets enter someone else's body through his/her nose or mouth, that person gets infected. In view of this, the droplet range control system 100 according to the present embodiment suppresses droplet infection by controlling ranges of droplets from persons.

More specifically, the droplet range control system 100 can suppress droplet infection by conditioning an environment in the space 90 illustrated in FIG. 2 and controlling ranges of droplets released by targets U1 and U2 in the space 90. The number of targets is not limited to two, and may be three or more, instead. The target U1 is an example of a first target, who is one of the targets in the space 90. The target U2 is an example of a second target, who is one of the targets in the space 90. For example, the droplet range control system 100 can make it less likely that the target U2 will be infected by droplets from the target U1 and that the target U1 will be infected by droplets from the target U2.

As illustrated in FIG. 1, the droplet range control system 100 includes an environment information obtaining unit 110, a target information obtaining unit 120, an estimation unit 130, a control unit 140, and a storage unit 150. The droplet range control system 100 is specifically achieved by an environment measuring apparatus 10, a human detection apparatus 20, a server apparatus 30, and an air conditioning device 40. The environment measuring apparatus 10, the human detection apparatus 20, the server apparatus 30, and the air conditioning device 40 are connected to one another by wire or wirelessly, for example, and can communicate data and information with one another.

A specific configuration for achieving the droplet range control system 100 is not limited to the example illustrated in FIG. 1. For example, the droplet range control system 100 may include more than one environment measuring apparatuses 10 and more than one human detection apparatuses 20 and need not include at least either the server apparatus 30 or the air conditioning device 40. Alternatively, the droplet range control system 100 may be achieved by a single device.

The environment information obtaining unit 110 is an example of a first obtaining unit that obtains environment information indicating at least wind speed, wind direction, temperature, humidity, or spatial scale in the space 90. More specifically, the environment information includes airflow information indicating the wind speed and the wind direction in the space 90, temperature information indicating the temperature in the space 90, humidity information indicating the humidity in the space 90, and spatial information indicating the spatial scale. The spatial scale is size and shape of the space 90. The spatial information may further indicate arrangement of furniture or devices in the space 90.

As illustrated in FIG. 1, the environment measuring apparatus 10 includes the environment information obtaining unit 110 in the present embodiment. The environment measuring apparatus 10 is, for example, a thermo-hygrometer 11 or anemometers 12 illustrated in FIG. 2. The thermo-hygrometer 11 is provided in the space 90 and measures the temperature and the humidity in the space 90. The anemometers 12 are provided in the space 90 and measure wind speed and wind direction at positions at which the anemometers 12 are provided. The environment measuring apparatus 10 may be a thermometer that measures temperature or a hygrometer that measures humidity, instead. The measured humidity is relative humidity, for example, but may be absolute humidity, instead.

As illustrated in FIG. 2, the droplet range control system 100 includes, for example, one thermo-hygrometer 11 and more than one anemometers 12. The number of thermo-hygrometers 11 and the number of anemometers 12 are not limited to this. The droplet range control system 100 may include more than one thermo-hygrometers 11 and one anemometer 12, instead. The thermo-hygrometers 11 may be provided in the space 90 at different positions and measure temperature and humidity at the positions at which the thermo-hygrometers 11 are provided. As a result, temperature distribution and humidity distribution in the space 90 can be accurately estimated. The droplet range control system 100 may include more than one thermometers and more than one hygrometers.

The target information obtaining unit 120 is an example of a second obtaining unit that obtains target information. The target information is information indicating positions and directions of faces of the targets U1 and U2 in the space 90 and the number of targets U1 and U2.

As illustrated in FIG. 1, the human detection apparatus 20 includes the target information obtaining unit 120 in the present embodiment. The human detection apparatus 20 is, for example, a camera 21 illustrated in FIG. 2. The camera 21 is a visible light camera, but may be an infrared camera, instead. The droplet range control system 100 may include more than one cameras 21. For example, the cameras 21 are provided in the space 90 at different positions. The cameras 21 are provided, for example, in such a way as to cover one another's blind spots of shooting ranges. The camera 21 captures an image of the space 90 to generate the captured image and outputs the generated captured image to the estimation unit 130 as target information. The captured image is a moving image, for example, but may be a still image, instead.

Image processing such as a face detection process is performed on a captured image to determine the number of targets and positions and directions of faces. A type of droplet suppression action may also be identified as a result of the image processing. In addition, a preliminary motion of a droplet release action is detected as a result of the image processing. The estimation unit 130 performs the image processing, for example, but the target information obtaining unit 120 may perform the image processing, instead.

Alternatively, the human detection apparatus 20 may be achieved by a device that reads data transmitted from IC tags 80 worn by the targets U1 and U2 or mobile information terminals, measuring devices worn by the targets, or the like. For example, the IC tags 80 or the mobile information terminals store attribute information indicating physical characteristics such as age, gender, and height of the targets. The IC tags 80 or the mobile information terminals may also store health information indicating health states of the targets. The measuring device measures heart rates, blood pressure, respiratory volume, or the like of the targets.

The estimation unit 130 is an example of a processing unit that estimates ranges droplets from the targets U1 and U2 on the basis of environment information and target information. The ranges of droplets are ranges over which droplets released from the targets fly after the targets take droplet release actions.

A range of droplets is a three-dimensional range in the space 90 and determined, for example, on the basis of a position of a target's mouth, a direction of the target's face, a direction in which the droplets are released, and reach of the droplets. The reach of droplets is estimated on the basis of distribution of environment values such as airflow distribution, temperature distribution, or humidity distribution in the space 90. The estimation unit 130 estimates a range of droplets for every target in the space 90. A specific example of the estimation of a range of droplets will be described later.

In the present embodiment, the estimation unit 130 also estimates the airflow distribution in the space 90 on the basis of airflow information. For example, the estimation unit 130 estimates the airflow distribution by conducting a fluid analysis on the basis of temporal changes in pieces of airflow information obtained as a result of measurement performed at different points. The fluid analysis is a computational fluid dynamics (CFD) analysis, for example, but is not limited to this.

The airflow distribution indicates wind speed and wind direction of airflow in each of subspaces (e.g., subspaces 91 illustrated in FIG. 4 or 5), which are obtained by dividing the space 90 in a three-dimensional matrix. The subspaces are three-dimensional spaces whose positions are represented by a three-dimensional Cartesian coordinate system (x, y, z), for example, but are not limited to this. The subspaces may be rectangular parallelepiped spaces or triangular pyramid spaces, instead.

The estimation unit 130 may also estimate the humidity distribution in the space 90 on the basis of humidity information. For example, the estimation unit 130 estimates the humidity distribution by conducting a simulation based on pieces of humidity information obtained as a result of measurement performed at different points. Humidity in spaces between the measurement points, which is not measured, may be obtained through interpolation or extrapolation of measured values.

The humidity distribution, as with the airflow distribution, indicates relative humidity in each of the subspaces, which are obtained by dividing the space 90 in a three-dimensional matrix. When there is only one point in the space 90 at which humidity is measured, relative humidity in the space 90 may be regarded as uniform.

The estimation unit 130 may also estimate the temperature distribution in the space 90 on the basis of temperature information. The temperature distribution is estimated, for example, in the same manner as the humidity distribution.

In the present embodiment, the estimation unit 130 estimates a range of droplets on the basis of at least one of the estimated airflow distribution, humidity distribution, and temperature distribution. Accuracy of estimating a range of droplets can be increased by using the distributions. Since droplets are easily carried along airflow, for example, reach and direction of droplets can be accurately estimated on the basis of the airflow distribution. Because distribution of saturation vapor density in the space 90 can be identified by estimating the humidity distribution or the temperature distribution, how easily droplets including moisture evaporate can be estimated. The more easily the droplets evaporate, the shorter the reach of the droplets, and the less easily the droplets evaporate, the longer the reach of the droplets.

As illustrated in FIG. 1, the server apparatus 30 includes the estimation unit 130 in the present embodiment. The server apparatus 30 may be provided in the space 90 or outside the space 90. The server apparatus 30 is achieved, for example, by a nonvolatile memory storing a program, a volatile memory that is a temporary storage area for executing the program, input and output ports, a processor that executes the program, and the like. The estimation unit 130 included in the server apparatus 30 may be achieved by software executed by the processor or hardware including circuit elements, such as an electronic circuit.

When a respiration area of the second target, who is one of the targets in the space 90, exists within a range of droplets from the first target included in the targets, the control unit 140 conditions the environment in the space 90 such that the respiration area gets out of a range of droplets from the first target. More specifically, when a respiration area of the target U2 exists within the range of droplets from the target U1, the control unit 140 conditions the environment in the space 90 such that the respiration area of the target U2 gets out of the range of droplets from the target U1. When a respiration area of the target U1 exists within a range of droplets from the target U2, on the other hand, the control unit 140 conditions the environment in the space 90 such that the respiration area of the target U1 gets out of the range of droplets from the target U2.

More specifically, when a respiration area of at least one person exists within a range of droplets from any one of the other targets in the space 90, the control unit 140 conditions the environment in the space 90 such that the respiration area gets out of the range of droplets. That is, the control unit 140 conditions the environment in the space 90 such that no range of droplets overlaps any respiration area between the targets in the space 90. A range of droplets from a target and a respiration area of the target usually overlap each other.

For example, the control unit 140 adjusts airflow between the target U1 and the target U2 on the basis of airflow distribution. More specifically, the control unit 140 adjusts wind speed of the airflow to 0.5 m/s or lower. A range of wind speed of 0.5 m/s or lower is determined in advance so that the targets in the space 90 can get a sense of comfort.

Alternatively, for example, the control unit 140 may adjust humidity in the space 90 between the target U1 and the target U2 on the basis of estimated humidity distribution. More specifically, the control unit 140 may adjust relative humidity in the space 90 between the target U1 and the target U2 to 40% to 70%. A range of relative humidity of 40% to 70% is determined in advance so that the targets in the space 90 can get a sense of comfort.

As illustrated in FIG. 1, the air conditioning device 40 includes the control unit 140 in the present embodiment. The control unit 140 may be included in the server apparatus 30, instead.

The air conditioning device 40 is, for example, one of blowers 41 or an air conditioner 42 illustrated in FIG. 2. The blowers 41 are devices that discharge airflow into the space 90 and can adjust wind speed (wind volume) and wind direction of the airflow to be discharged. The air conditioner 42 is a device that adjusts the temperature and the humidity in the space 90. As with the blowers 41, the air conditioner 42 may discharge, into the space 90, airflow whose wind speed and wind direction have been adjusted.

The storage unit 150 stores data to be used when the droplet range control system 100 operates. The storage unit 150 is, for example, a nonvolatile storage device such as an hard disk drive (HDD) or a semiconductor memory. Details of the data stored in the storage unit 150 will be described later.

In the present embodiment, the server apparatus 30 includes the storage unit 150. Alternatively, an apparatus other than the server apparatus 30 may include the storage unit 150.

2. Conditioning of Environment

Next, a specific example of the conditioning of the environment in the space 90 performed by the droplet range control system 100 will be described. The conditioning of the environment in the present embodiment includes the adjustment of airflow in the space 90 and the adjustment of humidity in the space 90. First, the adjustment of airflow will be described hereinafter.

2-1. Adjustment of Airflow

Figure 3:
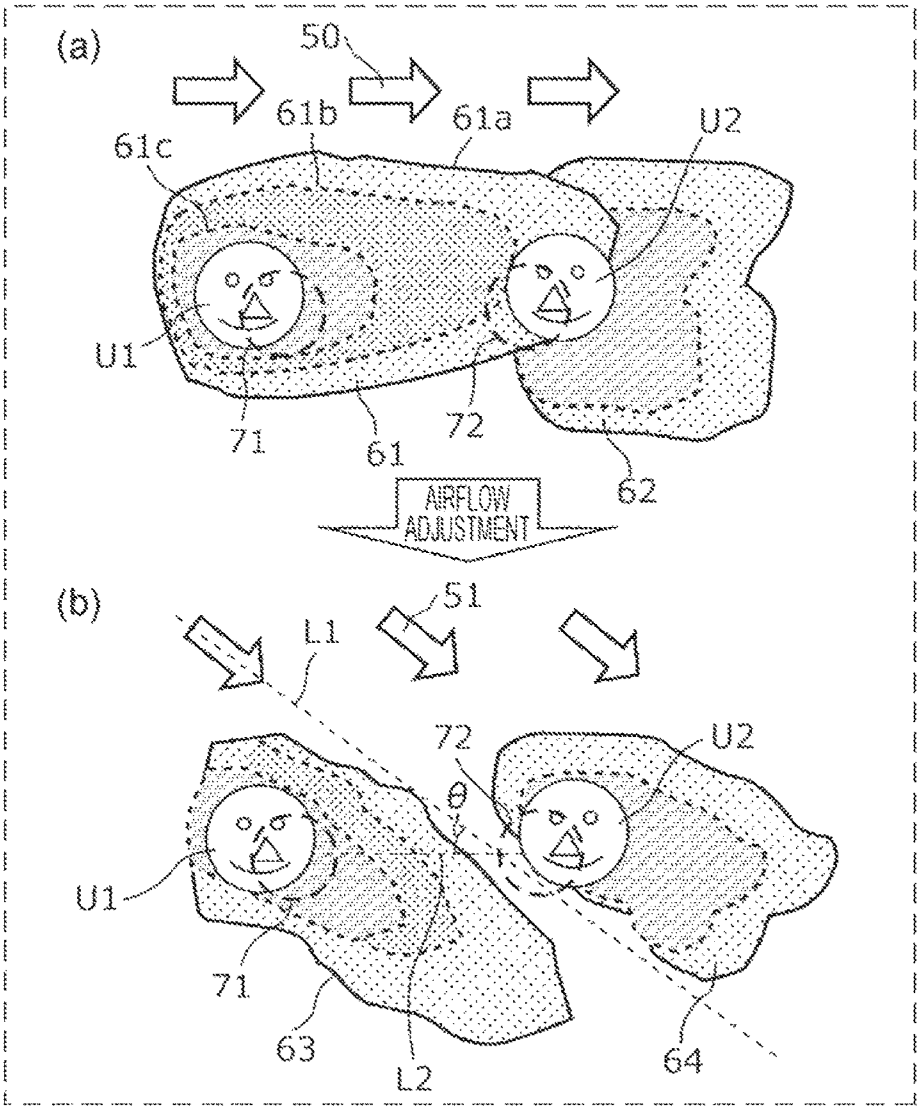
FIG. 3 is a diagram illustrating a change in a range of droplets at a time when the droplet range control system according to the embodiment adjusts airflow.

FIG. 3 is a diagram illustrating a change in a range of droplets at a time when the droplet range control system 100 according to the present embodiment adjusts airflow. More specifically, FIG. 3(*a*) illustrates a state before the adjustment of airflow, and FIG. 3(*b*) illustrates a state after the adjustment of airflow.

As illustrated in FIG. 3(*a*), there is airflow 50 between the target U1 and the target U2. The airflow 50 goes from the target U1 forward the target U2. A range 61 of droplets from the target U1 extends in a direction toward the target U2 along the airflow 50. A range 62 of droplets from the target U2 extends in a direction opposite the direction from the target U2 toward the target U1.

A respiration area 71 of the target U1 is an area whose center is at a nose or a mouth of the target U1. A respiration area 72 of the target U2 is an area whose center is at a nose or a mouth of the target U2. More specifically, the respiration areas 71 and 72 are each a spherical area that has a certain radius and whose center is at the nose, the mouth, or somewhere between the nose and the mouth (under the nose) of the target U1 or U2. A shape of a respiration area is not limited to a sphere, and may be an elliptical sphere, a cube, or a rectangular parallelepiped, instead.

As illustrated in FIG. 3(*a*), the respiration area 72 of the target U2 exists within the range 61 of droplets from the target U1. When the range 61 and the respiration area 72 overlap each other and the target U1 releases droplets, the droplets might enter a body of the target U2 as the target U2 breathes. That is, droplet infection from the target U1 to the target U2 might occur.

In the droplet range control system 100 according to the present embodiment, therefore, the control unit 140 adjusts the airflow between the target U1 and the target U2. For example, the control unit 140 adjusts airflow in the space 90 such that airflow 51, whose wind direction is different from that of airflow 50 before the adjustment, is caused between the target U1 and target U2. More specifically, as illustrated in FIG. 3(*b*), the control unit 140 adjusts the central processing unit (CPU) 51 such that an angle θ between a line L2 connecting the respiration area 71 of the target U1 and the respiration area 72 of the target U2 and the wind direction of the airflow 51 becomes 10° or larger. In FIG. 3(*b*), the wind direction of the airflow 51 is expressed by a broken line L1.

When the airflow 51 is caused between the target U1 and the target U2, the directions in which the ranges 61 and 62 of droplets extend change to directions along the wind direction of the airflow 51. More specifically, the ranges 61 and 62 before the adjustment turn into ranges 63 and 64 illustrated in FIG. 3(*b*). As a result, the overlap between the range 63 of droplets from the target U1 and the respiration area 72 of the target U2 is eliminated. Even if the target U1 releases droplets, therefore, a probability that the target U2 inhales the droplets as he/she breathes is sufficiently low. Droplet infection can thus be suppressed.

As illustrated in FIG. 3(*a*), the respiration area 71 of the target U1 does not exist within the range 62 of droplets from the target U2. Droplet infection from the target U2 to the target U1, therefore, need not be taken into consideration.

The wind speed and the wind direction of the airflow 51 are adjusted such that no range of droplets overlaps any respiration area between all the targets in the space 90. As illustrated in FIG. 3, when there are only two targets in the space 90, the control unit 140 adjust the wind direction of the airflow 51, for example, such that the angle θ becomes close to 90°. The adjusted wind direction is not limited to a wind direction in a horizontal plane, and may be a wind direction in a vertical plane or a plane inclined relative to a horizontal plane, instead. More specifically, the wind direction of the airflow 51 may be vertically downward or diagonally downward.

A method for turning the airflow 50 between the target U1 and the target U2 into the airflow 51, whose wind direction is different from that of the airflow 50, may be a direct method or an indirection method. First, the direct method will be described hereinafter with reference to FIG. 4.

Figure 4:
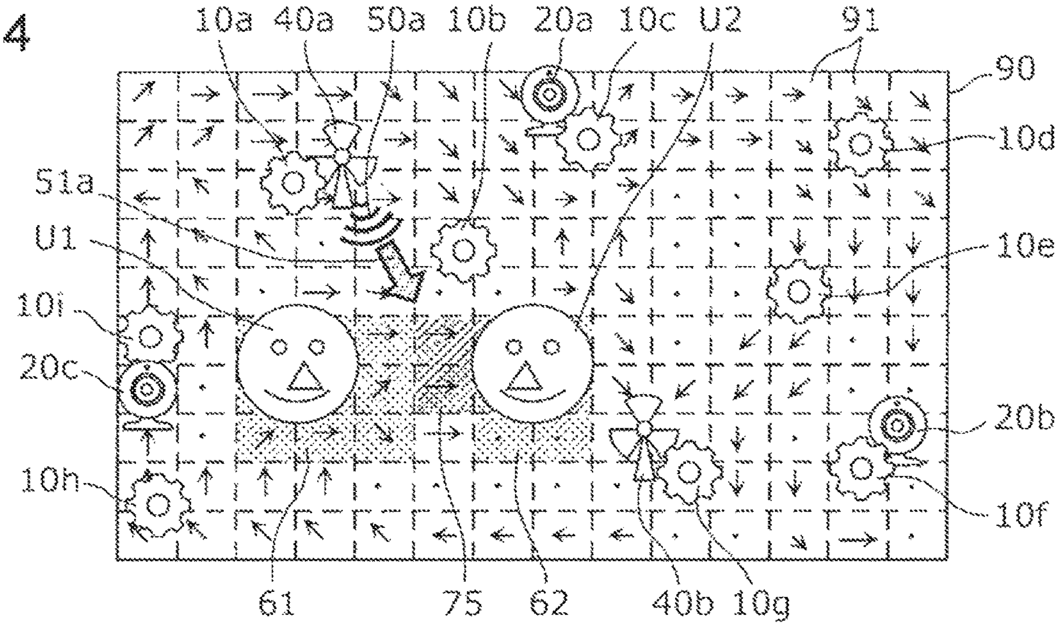
FIG. 4 is a diagram illustrating airflow distribution in the space estimated by the droplet range control system according to the embodiment and a process for conditioning an environment with direct airflow.

FIG. 4 is a diagram illustrating the airflow distribution in the space 90 estimated by the droplet range control system 100 according to the present embodiment and a process for conditioning the environment with direct airflow. As illustrated in FIG. 4, the space 90 is divided into the subspaces 91 in a three-dimensional matrix. FIG. 4 illustrates subspaces 91 arranged in two dimensions in a plane (e.g., a horizontal plane or a vertical plane) in the space 90. The direction and length of an arrow drawn in each of the subspaces 91 indicate wind direction and wind speed, respectively, based on the estimated airflow distribution. In FIG. 4, dots drawn in the subspaces 91 indicate that wind speed is substantially zero.

FIG. 4 illustrates an example in which nine environment measuring apparatuses 10*a* to 10*i*, three human detection apparatuses 20*a* to 20*c*, and two air conditioning devices 40*a* and 40*b* are provided in the space 90. Each of the environment measuring apparatuses 10*a* to 10*i* is the environment measuring apparatus 10 illustrated in FIG. 1 and measures wind direction and wind speed at a position at which the environment measuring apparatus is provided. The larger the number of environment measuring apparatuses 10 provided, the higher the accuracy of estimating the distribution of environment values. Each of the human detection apparatuses 20*a* to 20*c* is the human detection apparatus 20 illustrated in FIG. 1 and detects targets in the space 90 by capturing an image in such a way as to cover blind spots of the other human detection apparatuses at the position at which the human detection apparatus is provided. The larger the number of human detection apparatus 20, the higher the accuracy of detecting targets, that is, for example, the accuracy of detecting positions and directions of targets' faces. Each of the air conditioning devices 40*a* and 40*b* is the air conditioning device 40 illustrated in FIG. 1 and generates airflow in the space 90. The larger the number of air conditioning devices 40, the higher the accuracy of conditioning the environment in the space 90.

As illustrated in FIG. 4, the two targets U1 and U2 exist in the space 90. The range 61 of droplets from the target U1 and the range 62 of droplets from the target U2 are represented by hatching of dots. The ranges 61 and 62 are obtained as a result of estimation performed by the estimation unit 130.

In the example illustrated in FIG. 4, the range 61 of droplets from the target U1 and the respiration area of the target U2 overlap each other. An overlap area 75 between the range 61 and the respiration area is represented by hatching of broken lines and dots.

In this case, the control unit 140 selects, from the air conditioning devices 40 provided in the space 90, at least one air conditioning device capable of generating airflow between the target U1 and the target U2 and controls the selected air conditioning device 40. For example, the control unit 140 selects, from the air conditioning devices 40, an air conditioning device 40 closest to a space between the target U1 and the target U2.

In the example illustrated in FIG. 4, the control unit 140 selects the air conditioning device 40*a* and controls the air conditioning device 40*a* such that the air conditioning device 40*a* discharges airflow 50*a*. The airflow 50*a* goes through the space between the target U1 and the target U2 as it is (i.e. directly). That is, a wind direction of the airflow 50*a* immediately after being discharged from the air conditioning device 40*a* and a wind direction of airflow that goes through the space between the target U1 and the target U2 are substantially the same. An arrow 51*a*, which indicates a direction in which the airflow 50*a* is discharged, corresponds to the broken line L1 illustrated in FIG. 3(*b*). The overlap between the range 61 of droplets and the respiration area can thus be eliminated by directly sending the airflow 50*a* to the space between the target U1 and the target U2.

Figure 5:
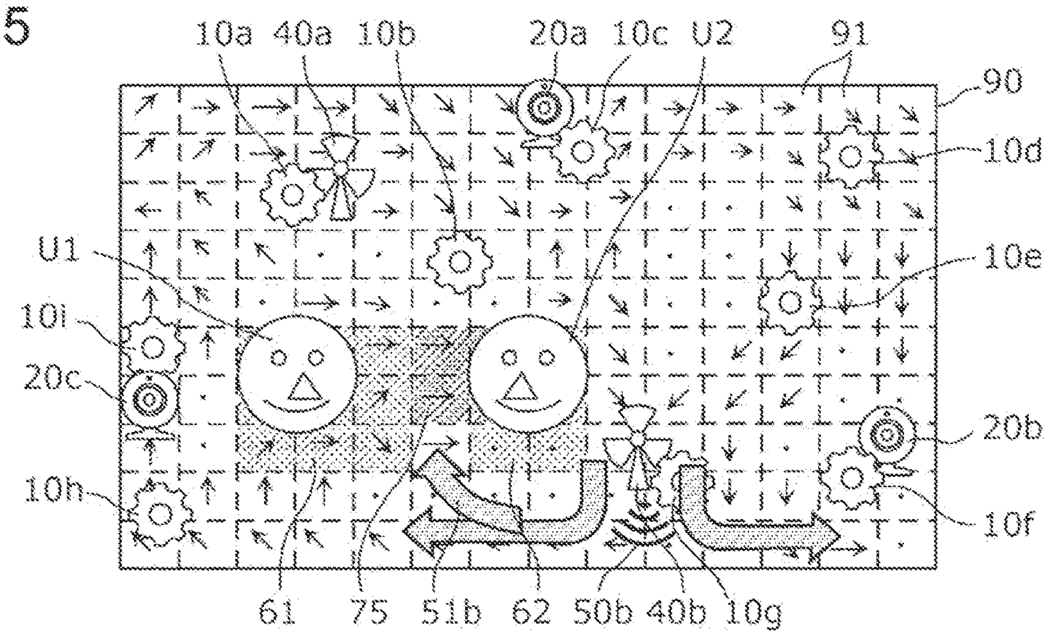
FIG. 5 is a diagram illustrating the airflow distribution in the space estimated by the droplet range control system according to the embodiment and a process for conditioning the environment with indirect airflow.

Next, an indirect method for turning the airflow 50 between the target U1 and the target U2 into the airflow 51, whose wind direction is different from that of the airflow 50, will be described with reference to FIG. 5. FIG. 5 is a diagram illustrating the airflow distribution in the space 90 estimated by the droplet range control system 100 according to the present embodiment and a process for conditioning the environment with indirect airflow.

As illustrated in FIG. 5, the control unit 140 controls the air conditioning device 40*b* such that the air conditioning device 40*b* discharges airflow 50*b*. The airflow 50*b* is discharged toward a wall in the space 90. After hitting the wall, the airflow 50*b* goes along the wall and part (more specifically, an airflow component indicated by an arrow 51*b*) of the airflow 50*b* goes through the space between the target U1 and the target U2.

The airflow 50*b* whose traveling direction is changed by the wall that defines the space 90 or a piece of furniture or a household appliance provided in the space 90 thus goes through the space between the target U1 and the target U2. That is, a wind direction of the airflow 50*b* immediately after being discharged from the air conditioning device 40*b* and a wind direction of the airflow between the target U1 and the target U2 are different from each other. The overlap between the range 61 of droplets and the respiration area can thus be eliminated by indirectly sending airflow to the space between the target U1 and the target U2.

The number of air conditioning devices 40 for generating airflow to be sent to the space between the target U1 and the target U2 need not be one. More than one air conditioning devices 40 may operate together to send airflow to the space between the target U1 and the target U2.

2-2. Adjustment of Humidity

Next, the adjustment of humidity in the space 90 will be described.

Figure 6:
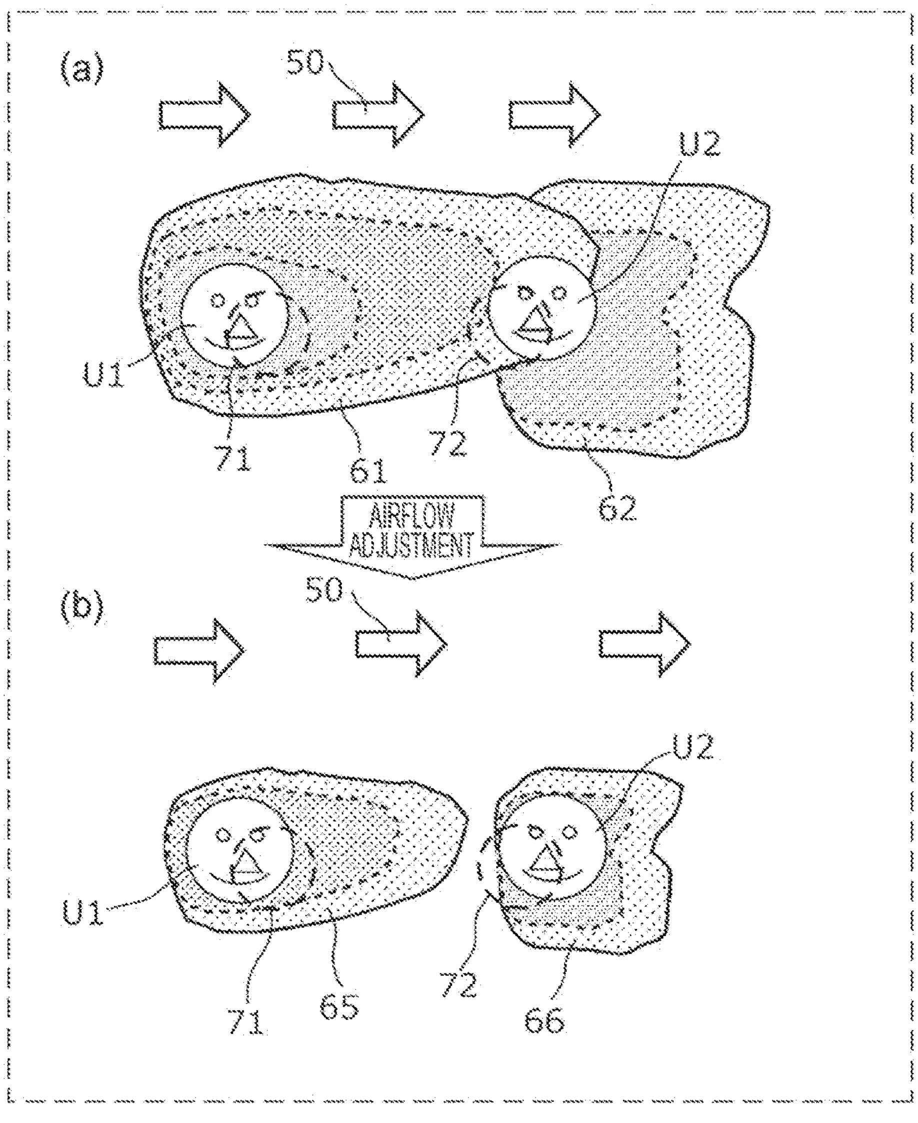
FIG. 6 is a diagram illustrating a change in a range of droplets at a time when the droplet range control system according to the embodiment adjusts humidity.

FIG. 6 is a diagram illustrating a change in a range of droplets at a time when the droplet range control system 100 according to the present embodiment adjusts humidity. More specifically, FIG. 6(*a*) illustrates a state before the adjustment of humidity, and FIG. 6(*b*) illustrates a state after the adjustment of humidity. FIG. 6(*a*) is the same as FIG. 3(*a*).

In the present embodiment, the control unit 140 adjusts humidity in the space (hereinafter referred to as a local space) between the target U1 and the target U2. The local space is, for example, a space between the respiration area 71 of the target U1 and the respiration area 72 of the target U2. More specifically, the local space is a space including the respiration area 71 and the respiration area 72 at both ends, respectively.

More specifically, the control unit 140 adjusts relative humidity in the local space by adjusting relative humidity in a space larger than the local space. For example, the control unit 140 adjusts overall relative humidity in the space 90. Alternatively, the control unit 140 may adjust relative humidity in a space including the targets U1 and U2. The control unit 140 may locally adjust the relative humidity in the local space, instead.

As humidity increases, moisture included in droplets becomes harder to evaporate and the droplets become larger in diameter and heavier. When humidity is high, therefore, droplets released from a person tend to fall to the ground due to gravity, and the reach of the droplets becomes shorter. As humidity decreases, on the other hand, moisture included in droplets becomes easier to evaporate and the droplets become smaller in diameter and lighter. The droplets tend to drift through the air, and the reach of the droplets becomes longer.

When the respiration area 72 exists within the range 61 of droplets, therefore, the control unit 140 increases humidity in the local space. Since the humidity is increased, the ranges 61 and 62 of droplets turn into ranges 65 and 66, respectively, illustrated in FIG. 6(*b*). More specifically, the range 65 of droplets after the increase in the humidity is smaller than the range 61 before the adjustment of the humidity. Similarly, the range 66 is smaller than the range 62.

As a result, the overlap between the range 65 of droplets from the target U1 and the respiration area 72 of the target U2 is eliminated. Even if the target U1 releases droplets, therefore, a probability that the target U2 inhales the droplets as he/she breathes can be sufficiently reduced. Droplet infection, therefore, can be suppressed.

3. Estimation of Range of Droplets

Next, a specific example of a method for estimating a range of droplets performed by the droplet range control system 100 according to the present embodiment will be described.

As described above, droplets are released from a person's mouth when the person takes a droplet release action such as sneezing. Reach of droplets is generally said to be within a range of 1 to 2 m, but depends on temperature and humidity in a space and wind speed and wind direction of airflow. A range of droplets also depends on physical characteristics of a person who releases the droplets, such as age, gender, and height. A range of droplets thus varies in accordance with factors deriving from an environment in a space and factors deriving from a human body. In other words, risks of increasing a range of droplets include risks deriving from an environment (hereinafter referred to as environmental risks) and risks deriving from a person (hereinafter referred to as human risks).

In the droplet range control system 100 according to the present embodiment, the estimation unit 130 estimates a range of droplets on the basis of the environmental risks and the human risks. More specifically, the estimation unit 130 estimates a range of droplets on the basis of environment information obtained by the environment information obtaining unit 110 and target information obtained by the target information obtaining unit 120 while referring to databases stored in the storage unit 150. A specific example of the databases stored in the storage unit 150 will be described hereinafter.

FIG. 7 is a diagram illustrating an example of an environmental risk database used by the droplet range control system 100 according to the present embodiment.

As illustrated in FIG. 7, one of five index values (i.e., environmental risk levels), namely "A" to "E", is given to each combination between relative humidity and wind direction in a direction between respiration areas (a direction along the line L2 in FIG. 3(*b*)). More specifically, relative humidity is classified into three levels, namely a range of 30% or lower, a range of 30% to 70%, and a range of 70% or higher. Wind speed is classified into four levels, namely a range of 0.25 m/s or lower, a range of 0.25 to 0.50 m/s, a range of 0.50 to 1.00 m/s, and a range of 1.00 m/s or higher. One of the five index values, namely "A" to "E", is given to each of 12 combinations obtained from the three level of relative humidity and the four levels of wind speed.

The index values "A" to "E" are indices for determining a maximum value of the reach of droplets on the basis of the environmental risks. The maximum value of the reach of droplets increases in order from "A" to "E". Details will be described later with reference to FIG. 9.

FIG. 8 is a diagram illustrating an example of a human risk database used by the droplet range control system 100 according to the present embodiment.

As illustrated in FIG. 8, one of six index values, namely "1" to "6", is given to each combination between a person's gender and age and a droplet release action. More specifically, a person's gender is classified into two types, namely male and female. A person's age is classified into three levels, namely elderly, adult, and child. Elderly herein refers to 65 years old or older, adult refers to 18 years old or older and younger than 65 years old, and child refers to younger than 18 years old, but the classification is not limited to this. A release action is classified into four types, namely respiration, conversation (utterance), coughing, and sneezing. One of the six index values (i.e., human risk levels), namely "1" to "6", is given to each of 24 combinations obtained from the two types of gender, the three levels of age, and the four types of release action.

The index values "1" to "6" are indices for determining a maximum value of the reach of droplets on the basis of the human risks. The maximum value of the reach of droplets increases in order from "1" to "6".

FIG. 9 is a diagram illustrating an example of a droplet reach database used by the droplet range control system 100 according to the present embodiment.

As illustrated in FIG. 9, reach in a linear direction is associated with each of 30 combinations obtained from the index values "A" to "E" based on the five levels of environmental risks and the index values "1" to "6" based on the six levels of human risks. The earlier in alphabetical order the index value, which is one of "A" to "E", based on the environmental risks, the shorter the reach, and the later in alphabetical order, the longer the reach. In addition, the smaller the index value, which is one of "1" to "6", based on the human risks, the shorter the reach, and the larger the index value, the longer the reach. That is, a value of reach is associated with each combination between the index values such that the reach becomes shorter in an upper-left part of a table of FIG. 9 and longer in a lower-right part.

As can be seen from FIGS. 7 and 9, the associated reach becomes shorter as the relative humidity increases and longer as the relative humidity decreases. The associated reach becomes shorter as the wind speed decreases and longer as the wind speed increases.

In addition, as can be seen from FIGS. 8 and 9, in terms of the droplet release action, the associated reach becomes longer in order of respiration, conversation, coughing, and sneezing. In the case of a male, the associated reach is the same as, or longer than, in the case of a female. In the case of an adult, the associated reach is the same as, or longer than, in the case of an elderly or a child. In the case of an elderly, the associated reach is the same as, or longer than, in the case of a child. The reach becomes longer in order of a male child, a male elderly, and a male adult especially when the droplet release action is coughing or sneezing. When the droplet release action is coughing or sneezing, the reach of a female adult is longer than a female child or a female elderly. When the droplet release action is respiration or conversion, there is no difference in reach due to gender and age.

For example, the estimation unit 130 determines one of the index values "A" to "E" on the basis of environment information obtained by the environment information obtaining unit 110 while referring to the environmental risk database illustrated in FIG. 7. The estimation unit 130 also determines one of the index values "1" to "6" on the basis of target information obtained by the target information obtaining unit 120 while referring to the human risk database illustrated in FIG. 8. The estimation unit 130 determines reach in the linear direction on the basis of the two determined index values while referring to the reach database illustrated in FIG. 9. The estimation unit 130 estimates, as the range 61 of droplets, a range extending in a front direction of the face of the target U1 from the mouth of the target U1 over the determined reach by a certain spread angle. The spread angle is a range whose angle in a cross section including the front direction becomes 10° to 20°, for example, but is not limited to this.

The reach illustrated in FIG. 9 may be corrected in accordance with a droplet suppression action taken by a target, a health state of the target, a height difference between targets, or the like. A correction coefficient for correcting the reach will be described hereinafter.

FIG. 10 is a diagram illustrating a correction coefficient database based on a first droplet suppression action used by the droplet range control system 100 according to the present embodiment.

A correction coefficient is, for example, a coefficient by which the reach illustrated in FIG. 9 is multiplied. That is, the larger the correction coefficient, the longer the reach, and the smaller the correction coefficient, the shorter the reach.

The first droplet suppression action is an action relating to a target's covering of his/her mouth. As illustrated in FIG. 10, the first droplet suppression action has three types, namely lack of covering of the mouth, covering of the mouth with the hands, and wearing of a mask.

A correction coefficient is associated with each of the three types of first droplet suppression action. When the target does not cover his/her mouth, released droplets tend to fly farther. When, for example, the target covers his/her mouth or is always wearing a mask, on the other hand, the reach of droplets is reduced. The correction coefficient decreases in order of lack of covering of the mouth, covering of the mouth with the hands, and wearing of a mask.

FIG. 11 is a diagram illustrating a correction coefficient database based on a second droplet suppression action used by the droplet range control system 100 according to the present embodiment.

The second droplet suppression action is an action relating to a direction of the face. More specifically, as illustrated in FIG. 11, the second droplet suppression action is classified into three levels in accordance with a turning angle of the face. The turning angle of the face is an angle between the line L2 connecting the respiration area 71 of the target U1 and the respiration area 72 of the target U2 and the front direction of the face of the target U1 (or the target U2).

When the turning angle of the face is small, the target U1 directly faces the respiration area 72 of the target U2, and droplets released from the target U1 tend to fly farther along the line L2. As the turning angle of the face increases, droplets are released in a direction more largely different from a direction along the line L2, and reach in the direction along the line L2 becomes shorter. As illustrated in FIG. 11, therefore, as the turning angle of the face increases, the correction coefficient decreases.

In the present embodiment, the estimation unit 130 estimates a range on the basis of a droplet suppression action taken by the target U1. For example, the estimation unit 130 determines a type of droplet suppression action taken by each of the targets U1 and U2 on the basis of target information obtained by the target information obtaining unit 120. More specifically, the estimation unit 130 determines whether the target is wearing a mask, whether the target is covering his/her mouth, and the turning angle of the face by performing image processing on a captured image output from the camera 21 or the like as target information. The estimation unit 130 determines the correction coefficient in accordance with the determined type of droplet suppression action while referring to the correction coefficient database illustrated in FIG. 10 or 11. The estimation unit 130 corrects the reach estimated on the basis of FIGS. 7 to 9 by multiplying the reach by the determined correction coefficient. The estimation unit 130 estimates the range of droplets on the basis of the corrected reach.

FIG. 12 is a diagram illustrating a correction coefficient database based on a health state used by the droplet range control system 100 according to the present embodiment.

As illustrated in FIG. 12, the health state has two types, namely a normal state (i.e., a healthy person) and a severely ill state. Compared to the normal state, the target tends to release droplets and the reach of released droplets tends to be long in the severely ill state. For this reason, a correction coefficient larger than one in the normal state, for example, is associated as a correction coefficient in the severely ill state.

The estimation unit 130 estimates a health state of the target U1 on the basis of at least either environment information or target information and estimates reach of droplets on the basis of the estimated health state. For example, the estimation unit 130 determines the health state of the target by estimating body surface temperature or heat radiation of the target on the basis of the environment information. More specifically, when an infrared camera is used as a thermometer of the environment measuring apparatus 10, for example, the estimation unit 130 determines that the health state of the target is the severely ill state if the body surface temperature or the heat radiation obtained from an image of the target captured by the infrared camera is higher than a predetermined threshold. Alternatively, the estimation unit 130 may determine the health state of the target on the basis of a heart rate or a respiratory volume indicated by the target information. The estimation unit 130 determines the correction coefficient in accordance with the determined health state while referring to the correction coefficient database illustrated in FIG. 12. The estimation unit 130 corrects the reach estimated on the basis of FIGS. 7 to 9 by multiplying the reach by the determined correction coefficient. The estimation unit 130 estimates the range of droplets on the basis of the corrected reach.

FIG. 13 is a diagram illustrating a correction coefficient database based on a height difference used by the droplet range control system 100 according to the present embodiment.

The height difference is a difference in height between the respiration area 71 of the target U1 and the respiration area 72 of the target U2. When the range of droplets from the target U1 is estimated and the respiration area 71 of the target U1 is located higher than the respiration area 72 of the target U2, for example, the height difference is a positive value. Since the height difference is essentially a difference in body height between the targets U1 and U2 when both the targets U1 and U2 are standing, a body height difference may be used instead of a height difference, instead.

As illustrated in FIG. 13, the height difference is classified into three levels, namely a range of 0 to 10 cm, a range of 10 to 20 cm, and a range of 20 cm or larger. Since droplets are affected by gravity, droplets fly farther in a diagonally downward direction. That is, when the respiration area 72 of the target U2 is located lower than the respiration area 71 of the target U1 in the estimation of the range of droplets from the target U1, the reach of droplets from the target U1 along the line L2 becomes longer. As the height difference increases, therefore, the correction coefficient also increases.

The estimation unit 130 estimates a height difference between two targets on the basis of target information and estimates a range of droplets on the basis of the estimated height difference. For example, the estimation unit 130 calculates a value obtained by subtracting the height of the center of the respiration area 72 of the target U2 from the height of the center of the respiration area 71 of the target U1 as the height difference. The estimation unit 130 determines the correction coefficient on the basis of the calculated height difference while referring to the correction coefficient database illustrated in FIG. 13. The estimation unit 130 corrects the reach estimated on the basis of FIGS. 7 to 9 by multiplying the reach by the determined correction coefficient. The estimation unit 130 estimates the range of droplets on the basis of the corrected reach.

In the droplet range control system 100 according to the present embodiment, the control unit 140 may condition an environment in consideration of comfort, instead.

FIG. 14 is a diagram illustrating an example of a comfort database used by the droplet range control system 100 according to the present embodiment. In the database illustrated in FIG. 14, five index values, namely “A” to “E”, are given as index values indicating comfort levels. The earlier in alphabetical order the index value, the higher the comfort level, and the later in alphabetical order, the lower the comfort level.

When relative humidity is 30% or lower or 70% or higher, for example, comfort of a person in the space 90 is affected. When relative humidity is 30% or lower, there is also a problem in that survival time of viruses increases. When relative humidity is 70% or higher, on the other hand, there is also a problem in that mold appears and grows.

When wind speed between respiration areas is 0.25 m/s or lower, it is likely that the target does not feel a wind. When wind speed is 0.25 m/s to 0.50 m/s, it is likely that the target might feel a wind but does not feel uncomfortable in general. When wind speed is 0.50 m/s or higher, the target might feel uncomfortable.

In the droplet range control system 100 according to the present embodiment, the control unit 140 performs control while giving priority to ranges with higher comfort levels. When the ranges of droplets and the respiration areas of the targets U1 and U2 do not overlap each other, for example, the control unit 140 conditions the environment within ranges corresponding to the index value “A”, that is, a range of relative humidity of 30% to 70% and a range of airflow wind speed of 0.25 m/s or lower. If the ranges of droplets and the respiration areas of the targets U1 and U2 overlap each other as a result of the adjustment of the environment within the ranges corresponding to the index value “A”, the control unit 140 conditions the environment within ranges corresponding to the index value “B”, which offers a second highest comfort level. In the present embodiment, the control unit 140 thus performs control in such a way as to offer a highest comfort level insofar as the ranges of droplets and the respiration areas of the targets U1 and U2 do not overlap.

As a result, a good balance between securement of comfort and suppression of droplet infection can be achieved.

4. Operation (Method for Controlling Range of Droplets)

Next, an operation (i.e., a method for controlling a range of droplets) performed by the droplet range control system 100 according to the present embodiment will be described.

Figure 15:
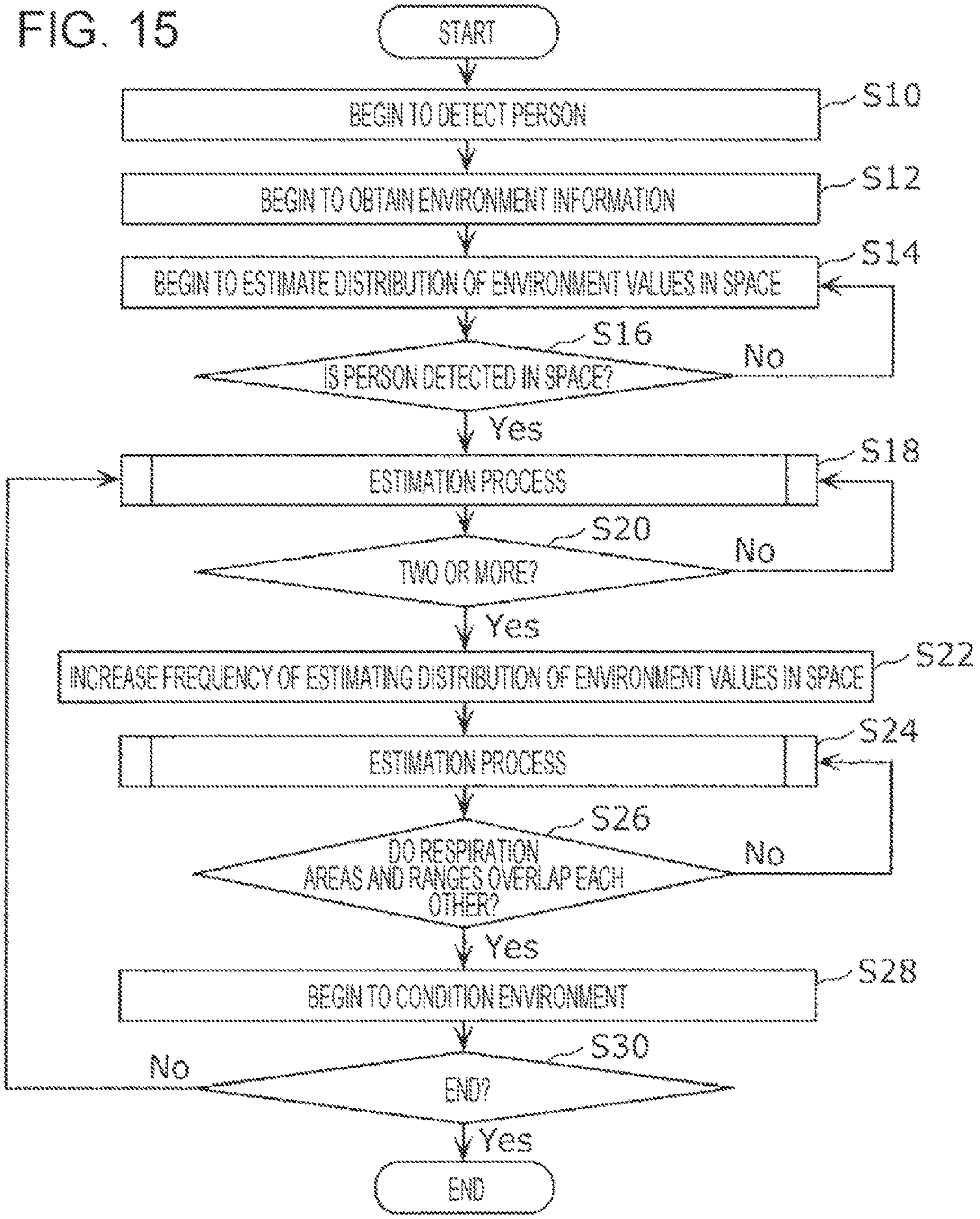
FIG. 15 is a flowchart illustrating an operation performed by the droplet range control system according to the embodiment.

FIG. 15 is a flowchart illustrating the operation performed by the droplet range control system 100 according to the present embodiment.

As illustrated in FIG. 15, first, the droplet range control system 100 begins to detect a person (S10). For example, the human detection apparatus 20 is activated and caused to begin to output target information. More specifically, the camera 21 is activated and caused to capture an image of the space 90 to generate and output the captured image.

Next, the droplet range control system 100 begins to obtain environment information (S12). For example, the environment measuring apparatus 10 is activated and caused to output environment information. More specifically, the thermo-hygrometer 11 and the anemometers 12 are activated and caused to measure the temperature, the humidity, the wind speed, and the wind direction in the space 90 and output measured values.

Next, the estimation unit 130 begins to estimate the distribution of environment values in the space 90 (S14). More specifically, the estimation unit 130 estimates the airflow distribution in the space 90 on the basis of the wind speed and the wind direction included in the environment information and the spatial scale. Alternatively, the estimation unit 130 may estimate the humidity distribution in the space 90 on the basis of the humidity included in the environment information and the spatial scale. The estimation unit 130 may estimate the temperature distribution in the space 90 on the basis of the temperature included in the environment information and the spatial scale, instead. The estimation unit 130 may estimate all of the airflow distribution, the humidity distribution, and the temperature distribution, or estimate only one of these distributions.

The obtaining of environment information and the generation of the distribution of environment values are repeated until a person is detected in the space 90 (No in S16). The detection of a person is performed by the estimation unit 130 on the basis of image processing performed on the captured image, a result of the detection performed by a human detection sensor, or management information regarding entering into and leaving from the space 90.

For example, card authentication, biometric authentication, or the like may be performed in the management of entering and leaving. More specifically, a door for entering the space 90 may be opened by reading an IC tag 80 with a card reader. The IC tag 80 may store attribute information such as the age, gender, and personal information of the target. The estimation unit 130 may obtain, for example, presence or absence of targets in the space 90 and attribution information regarding targets, instead.

When a person is detected in the space 90 (Yes in S16), the estimation unit 130 estimates the airflow distribution in the space 90 and a range of droplets (S18). Details of the estimation process will be described with reference to FIG. 16.

Figure 16:
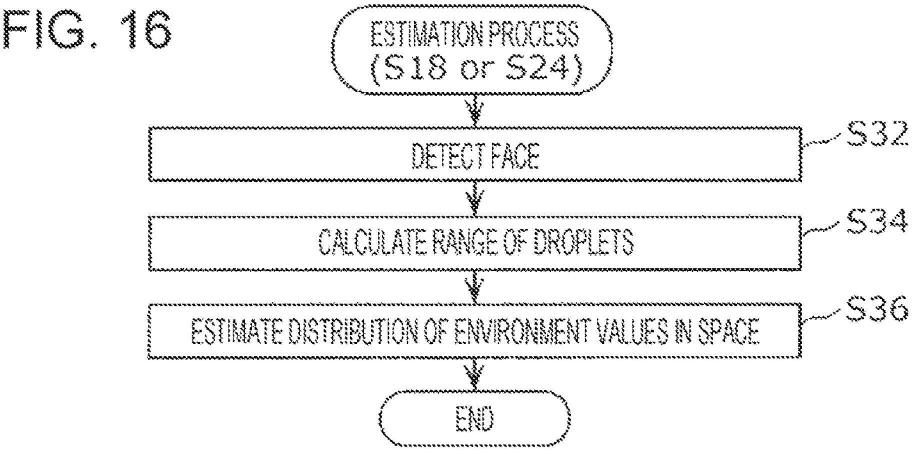
FIG. 16 is a flowchart illustrating an example of an estimation process performed by the droplet range control system according to the embodiment.

FIG. 16 is a flowchart illustrating an example of the estimation process performed by the droplet range control system 100 according to the present embodiment. More specifically, FIG. 16 illustrates details of step S18 or S24 illustrated in FIG. 15.

As illustrated in FIG. 16, the estimation unit 130 detects a position of a face on the basis of the target information (S32). For example, the estimation unit 130 obtains a direction of the target's face and a position of the target's mouth by performing image processing on the captured image.

Next, the estimation unit 130 estimates the range of droplets (S34). More specifically, the estimation unit 130 determines an environmental risk level on the basis of the environment information while referring to the environmental risk database illustrated in FIG. 7 and a human risk level on the basis of the target information while referring to the human risk database illustrated in FIG. 8. The estimation unit 130 then determines reach on the basis of the determined environmental risk level and human risk level while referring to the reach database illustrated in FIG. 9. Furthermore, the estimation unit 130 also determines a correction coefficient while referring to the correction coefficient database illustrated in FIGS. 10 to 13 and corrects the determined reach by multiplying the reach by the correction coefficient. The estimation unit 130 estimates the range on the basis of the corrected reach.

Furthermore, the estimation unit 130 estimates the distribution of environment values in the space 90 (S36). As a result, even if the person in the space 90 moves and the airflow distribution, the humidity distribution, or the temperature distribution in the space 90 changes, for example, a process based on the latest airflow distribution, humidity distribution, or temperature distribution can always be performed.

As illustrated in FIG. 15, the process illustrated in FIG. 16 is repeated until two or more targets are detected in the space 90 (No in S20). That is, the detection of the face and the estimation of the range of droplets and the distribution of environment values in the space 90 are repeated. Although a timing at which the detection and the estimation are repeated is not particularly limited, the detection and the estimation may be repeated at intervals of, for example, one to several minutes.

If two or more targets are detected in the space 90 (Yes in S20), the droplet range control system 100 increases the frequency of estimating the distribution of environment values (S22). For example, the estimation unit 130 performs the estimation, which has been performed at intervals of several minutes, at intervals of one minute or several seconds. The estimation unit 130 performs the estimation process illustrated in FIG. 16 with the increased frequency (S24).

Next, the estimation unit 130 determines whether respiration areas and ranges of droplets overlap each other (S26). More specifically, the estimation unit 130 determines whether the respiration area of the target U2 exists within the range of droplets from the target U1 and whether the respiration area of the target U1 exists within the range of droplets from the target U2.

If the respiration areas and the ranges of droplets do not overlap each other (No in S26), the estimation unit 130 performs the estimation process illustrated in FIG. 16 (S24). If the respiration areas and the ranges of droplets overlap each other (Yes in S26), the control unit 140 begins to condition the environment (S28). More specifically, the control unit 140 adjusts wind direction and wind speed of airflow between the targets U1 and U2 such that the overlap between the respiration areas and the ranges of droplets is eliminated. Alternatively, the control unit 140 increases relative humidity between the target U1 and the target U2 so that the overlap between the respiration areas and the ranges of droplets is eliminated.

The processing in steps S18 to S28 is then repeated until the process for controlling a range of droplets ends (No in S30). As a result, when there are two or more targets in the space 90, an environment in which an overlap between a respiration area and a range of droplets is eliminated is maintained, and droplet infection can be suppressed.

In a repetition at a time when a result of step S30 is No, the process for increasing frequency in step S22 may be omitted.

In the droplet range control system 100 according to the present embodiment, the estimation unit 130 performs a process for detecting a preliminary motion of a droplet release action in parallel with the operation illustrated in FIGS. 15 and 16. If a preliminary motion is detected, an interruption process illustrated in FIG. 17 is performed. FIG. 17 is a flowchart illustrating a process performed by the droplet range control system 100 according to the present embodiment at a time when a preliminary motion is detected.

As illustrated in FIG. 17, if a preliminary motion is detected (Yes in S40), the estimation unit 130 predicts a release direction of droplets and the amount of droplets released on the basis of the detected preliminary motion and estimates the range of droplets on the basis of a result of the prediction (S42). A preliminary motion is, for example, a motion made by a target before sneezing. More specifically, a preliminary motion is a motion generally made before sneezing, such as bending of the body backward, rubbing of the nose, closing of the eyes, and covering of the mouth with the hands. Because habits of each target tend to appear in a preliminary motion, the storage unit 150 may store a database in which a preliminary motion is associated with each target. For example, the estimation unit 130 detects a preliminary motion on the basis of a captured image (a video, more specifically) if a target makes a motion that matches a preliminary motion stored in the database.

If a preliminary motion is detected, the control unit 140 conditions the environment beyond a predetermined adjustment range. More specifically, the control unit 140 causes the air conditioning device 40 to operate at maximum power (S44). For example, the control unit 140 operates the air conditioning device 40 such that the airflow between the target U1 and the target U2 becomes as fast as possible. For example, the control unit 140 causes the air conditioning device 40*a* to discharge airflow whose wind speed is as high as possible to the space between the target U1 and the target U2.

As a result, if the target U1 makes a motion of bending his/her body backward and opening his/her mouth open wide in order to sneeze, for example, strong airflow can be caused between the target U1 and the target U2. Even if droplets are released from the target U1 farther than estimated, therefore, the droplets do not reach the respiration area of the target U2. Droplet infection can thus be suppressed more effectively.

Modification

Next, a modification of the droplet range control system according to the present embodiment will be described.

In the above embodiment, an example in which the environment in the space 90 is conditioned when there are two or more targets in the space 90 has been described. In the present modification, on the other hand, the environment in the space 90 is conditioned on the basis of action histories of the targets. That is, the environment in the space 90 can be conditioned even when there are not two or more targets in the space 90.

FIG. 18 is a diagram illustrating a positional relationship between the two targets U1 and U2 of a droplet range control system according to the present modification. When the target U1 is a person (employee) who cares for or nurses the target U2 (inmate), for example, a condition in which, as illustrated in FIG. 18, the target U1 is standing for a long time beside a bed 82 in which the target U2 lies down frequently occurs. In addition, a time at which the target U1 appears in front of the target U2 for caregiving or nursing service is usually the same every day. A specific positional relationship between the targets U1 and U2 thus includes a long-time positional relationship and a regularly repeated positional relationship.

The "positional relationship" refers to a fact that "the target U1 is located at a first place and the target U2 is located at a second place".

The "long-time positional relationship" refers to a relationship that satisfies "(a period for which the target U1 is located at the first place and the target U2 is located at the second place)≥(predetermined period)". In the above example, the long-time positional relationship is a positional relationship in which the target U1 is standing for a long time beside the bed 82 in which the target U2 lies down.

The "regularly repeated positional relationship" is a relationship that satisfies "the target U1 is located at the first place at a time t1 and the target U2 is located at the second place at the time t1, . . . , and the target U1 is located at the first place at a time tn and the target U2 is located at the second place at the time tn, where $\{t(k-1)-tk\}\approx\{tk-t(k+1)\}$, $1\leq(k-1)$, $n\leq(k+1)$, $1<n$, n is a natural number, and k is a natural number". In the above example, the regularly repeated positional relationship is a positional relationship in which the target U1 repeatedly appears in front of the target U2 for caregiving or nursing service at the same time every day.

In the present modification, therefore, the estimation unit 130 estimates, on the basis of an action history of each of the target U1 and the target U2, a positional relationship between the target U1 and the target U2 that continues for a period longer than the predetermined period and/or a regularly repeated positional relationship between the target U1 and the target U2. Information indicating the action histories are stored in the storage unit 150.

For example, the estimation unit 130 detects a positional relationship between the target U1 and the target U2 at each time on the basis of the action histories of the target U1 and the target U2 within a certain period of time, such as a day or a week. Furthermore, the estimation unit 130 calculates accumulated time for each positional relationship by accumulating periods for which the same positional relationship continues. The estimation unit 130 determines a positional relationship whose calculated accumulated time is longer than the predetermined period as a specific positional relationship. Similarly, the estimation unit 130 determines a positional relationship repeated at the same time in a certain period of time as a specific positional relationship. The determined specific positional relationships are stored in the storage unit 150 as a database. The determination of specific positional relationships based on the action histories is achieved, for example, by machine learning. By accumulating action histories as necessary, accuracy of determining a specific positional relationship can be increased.

FIG. 19 is a diagram illustrating a specific action database used by the droplet range control system according to the present modification. As illustrated in FIG. 19, a condition under which an action is taken and a positional relationship between two targets when the action is taken are associated with each other for each action. "Action 001", for example, indicates that the two targets are both located near a door at 13:00. This is obtained, for example, when the target U1 has repeatedly visited the target U2 at 13:00. In addition, "Action 002" indicates that the target U1 is located near the bed 82 and the target U2 lies down in the bed 82 for two minutes after the target enters a room.

Before a specific positional relationship is established, the control unit 140 conditions the environment in the space 90 such that the respiration area of the target U2 gets out of the range of the target U1. More specifically, the control unit 140 refers to the specific action database illustrated in FIG. 19 and conditions, before a condition included in the specific action database under which an action is taken is satisfied, the environment in the space 90 such that the respiration area of the target U2 at a time when the action is taken gets out of the range of droplets from the target U1.

When the target U1 and the target U2 are located near the door, for example, the control unit 140 can prevent the respiration areas of the targets U1 and U2 and the ranges of droplets from the targets U1 and U2 do not overlap each other by generating airflow near the door before 13:00. That is, the control unit 140 can achieve an environment in which the respiration areas of the targets U1 and U2 and the ranges of droplets from the targets U1 and U2 do not overlap each other before the target U1 and the target U2 actually stand near the door.

As a result, for example, unlike when control starts after a target appears, an environment in which droplet infection is suppressed is achieved in advance, and droplet infection can be suppressed more efficiently.

Other Embodiments

Although the droplet range control system and the method for controlling a range of droplets according to one or more aspects have been described above on the basis of an embodiment, the present disclosure is not limited to this embodiment. The present disclosure also includes modes obtained by modifying the embodiment in various ways conceivable by those skilled in the art without deviating from the scope of the present disclosure and modes constructed by combining together components from different embodiments.

For example, the estimation unit 130 may estimate more than one ranges of droplets for each level. FIGS. 3(*a*) and 3(*b*) illustrate the ranges 61 and 62 of droplets while giving different levels. Different levels are given to each range on the basis of, for example, a droplet release action, a droplet suppression action, a health state, or the like of a target.

The range 61 of droplets from the target U1, for example, includes ranges 61*a* to 61*c* corresponding to three different levels. The largest range 61*a* is a range over which droplets are estimated to fly when the target U1 sneezes without taking any action against the release of droplets. The second largest range 61*b* is a range over which droplets are estimated to fly when the target U1 coughs without taking any action against the release of droplets. The smallest range 61*c* is a range over which droplets are estimated to fly when the target U1 covers his/her mouth. The same holds for the range 62.

When more than one ranges are estimated, a range according to an action taken by the target U1 can be selected, and the environment can be appropriately conditioned. When the smallest range 61*c* is selected, the respiration area 72 of the target U2 does not overlap the range 61*c*. The environment, therefore, need not be conditioned. Droplet infection can thus be suppressed more efficiently.

In addition, for example, although the adjustment of airflow or the adjustment of humidity has been described as a specific example of the conditioning of the environment in the above embodiment, the droplet range control system 100 may adjust both airflow and humidity. In addition, when either airflow or humidity is to be adjusted, a manager or a target may select the adjustment of airflow or the adjustment of humidity in advance. The manager or the target may set order of priority to the adjustment of airflow and the adjustment of humidity, instead, and the droplet range control system 100 may condition the environment in order of priority. If an overlap between a range of droplets and a respiration area is not eliminated with an adjustment method of highest priority, for example, the environment may be conditioned by also using (or by selectively using) an adjustment method of second highest priority.

In addition, a communication method used between the apparatuses described in the above embodiment is not particularly limited. When wireless communication is performed between the apparatuses, a method (communication standard) employed for the wireless communication is, for example, short-distance wireless communication such as ZigBee (registered trademark), Bluetooth (registered trademark), or wireless local area network (LAN). Alternatively, the method (communication standard) employed for the wireless communication may be communication over a wide-area communication network such as the Internet. Alternatively, wired communication may be performed between the apparatuses, instead of wireless communication. The wired communication is specifically PLC (power line communication) or communication employing a wired LAN.

In addition, in the above embodiment, a process performed by a certain processing unit may be performed by another processing unit. In addition, order of processes may be changed, or processes may be performed in parallel with one another. The distribution of components included in the droplet range control system to the apparatuses is an example. For example, a component included in an apparatus may be included in another apparatus. In addition, the droplet range control system may be achieved as a single apparatus, instead.

For example, each process described in the above embodiment may be achieved by a single apparatus (system) through centralized processing or by more than apparatuses through distributed processing. In addition, one or more processors may be provided in order to execute the program. That is, centralized processing may be performed, or distributed processing may be performed.

In addition, in the above embodiment, some or all of the components such as the control unit may be achieved by dedicated hardware or by executing a software program suitable for each of the components. The components may be achieved by reading and executing software programs stored in a storage medium such as an HDD or a semiconductor memory using a program execution unit such as a CPU or a processor, instead.

In addition, the components such as the control unit may be achieved by one or more electronic circuits. The one or more electronic circuits may each be a general-purpose circuit or a dedicated circuit.

The one or more electronic circuits may each include, for example, a semiconductor device, an IC, or a large-scale integration (LSI) circuit. The IC or the LSI circuit may be integrated on a single chip or more than one chips. Although IC or LSI is used here, the term used changes depending on a degree of integration, and system LSI, very-large-scale integration (VLSI), or ultra-large-scale integration (ULSI) may be used, instead. In addition, a field-programmable gate array (FPGA), which is programed after an LSI circuit is fabricated, can also be used for the same purposes.

In addition, general or specific aspects of the present disclosure may be implemented as a system, an apparatus, a method, an IC, or a computer program, instead. Alternatively, the general or specific aspects of the present disclosure may be implemented as a non-transitory computer-readable storage medium storing the computer program, such as an optical disc, an HDD, or a semiconductor memory. Alternatively, the general or specific aspects of the present disclosure may be implemented as any selective combination of a system, an apparatus, a method, an IC, a computer program, and a storage medium.

In addition, the above embodiments may be subjected to modification, replacement, addition, omission, or the like in various ways without deviating from the scope of the claims or a scope equivalent thereto.

The present disclosure can be used as a droplet range control system capable of efficiently suppressing droplet infection and used for a management system for air conditioning equipment or the like in various spaces such as a general house, an office, a school, a hospital, a nursing facility, or a vehicle.

What is claimed is:

1. A droplet range control system comprising:

at least one memory configured to store a program; and at least one processor configured to execute the program and control the droplet range control system to:

obtain environment information indicating at least wind speed in a space, wind direction in the space, temperature in the space, humidity in the space, or spatial scale;

obtain target information indicating positions and directions of faces of a first target and a second target in the space;

estimate a range of droplets from the first target on a basis of the environment information and the target information; and if a respiration area of the second target exists within the range, condition an environment in the space using an air conditioning device that is controlled based on the estimation such that the respiration area gets out of the range, the estimation being repeated if the respiration area of the second target does not exist within the range.

2. The droplet range control system according to claim 1,
wherein the environment information indicates the humidity in the space,
wherein the at least one processor is further configured to execute the program and control the droplet range control system to also estimate humidity distribution in the space,
wherein the environment to be conditioned is first humidity in a space between the first target and the second target, and
wherein the at least one processor is further configured to execute the program and control the droplet range control system to adjust the first humidity on a basis of the humidity distribution.

3. The droplet range control system according to claim 2,
wherein the at least one processor is further configured to execute the program and control the droplet range control system to adjust the first humidity to relative humidity of higher than or equal to 40% and lower than or equal to 70%.

4. The droplet range control system according to claim 1,
wherein the environment information indicates the wind speed and the wind direction in the space,
wherein the at least one processor is further configured to execute the program and control the droplet range control system to also estimate airflow distribution in the space,
wherein the environment to be conditioned is first airflow between the first target and the second target, and
wherein the at least one processor is further configured to execute the program and control the droplet range control system to adjust the first airflow on a basis of the airflow distribution.

5. The droplet range control system according to claim 4,
wherein the at least one processor is further configured to execute the program and control the droplet range control system to adjust the first airflow such that an angle between a line connecting a respiration area of the first target and the respiration area of the second target and a wind direction of the first airflow becomes larger than or equal to 10°.

6. The droplet range control system according to claim 4,
wherein the at least one processor is further configured to execute the program and control the droplet range control system to adjust wind speed of the first airflow to lower than or equal to 0.5 m/s.

7. The droplet range control system according to claim 1,
wherein the at least one processor is further configured to execute the program and control the droplet range control system to estimate the range further on a basis of attribute information indicating a physical characteristic of the first target.

8. The droplet range control system according to claim 1,
wherein the at least one processor is further configured to execute the program and control the droplet range control system to estimate a health state of the first target on a basis of at least either the environment information or the target information and then estimate the range on a basis of the estimated health state.

9. The droplet range control system according to claim 1,
wherein the at least one processor is further configured to execute the program and control the droplet range control system to detect a preliminary motion of a droplet release action taken by the first target, predict a release direction of the droplets and an amount of droplets released on a basis of the detected preliminary motion, and estimate the range further on a basis of the prediction, and
wherein, if the preliminary motion is detected, the at least one processor is further configured to execute the program and control the droplet range control system to condition the environment beyond a predetermined adjustment range.

10. The droplet range control system according to claim 1,
wherein the at least one memory is further configured to store an action history of each of the first target and the second target,
wherein the at least one processor is further configured to execute the program and control the droplet range control system to also estimate, on a basis of the action histories, that the first target is located at a first place and the second target is located at a second place at a first time, and
wherein the at least one processor is further configured to execute the program and control the droplet range control system to condition the environment in the space such that the respiration area of the second target located at the second place gets out of the range of droplets from the first target located at the first place before the first time.

11. The droplet range control system according to claim 1,
wherein the at least one processor is further configured to execute the program and control the droplet range control system to estimate the range on a basis of a droplet suppression action taken by the first target.

12. A method for controlling a range of droplets, the method comprising:
obtaining environment information indicating at least wind speed in a space, wind direction in the space, temperature in the space, humidity in the space, or spatial scale;
obtaining target information indicating positions and directions of faces of a first target and a second target in the space;
estimating a range of droplets from the first target on a basis of the environment information and the target information; and
conditioning, if a respiration area of the second target exists within the range, an environment in the space using an air conditioning device that is controlled based on the estimating such that the respiration area gets out of the range, the estimating being repeated if the respiration area of the second target does not exist within the range.

* * * * *